UNITED STATES PATENT OFFICE.

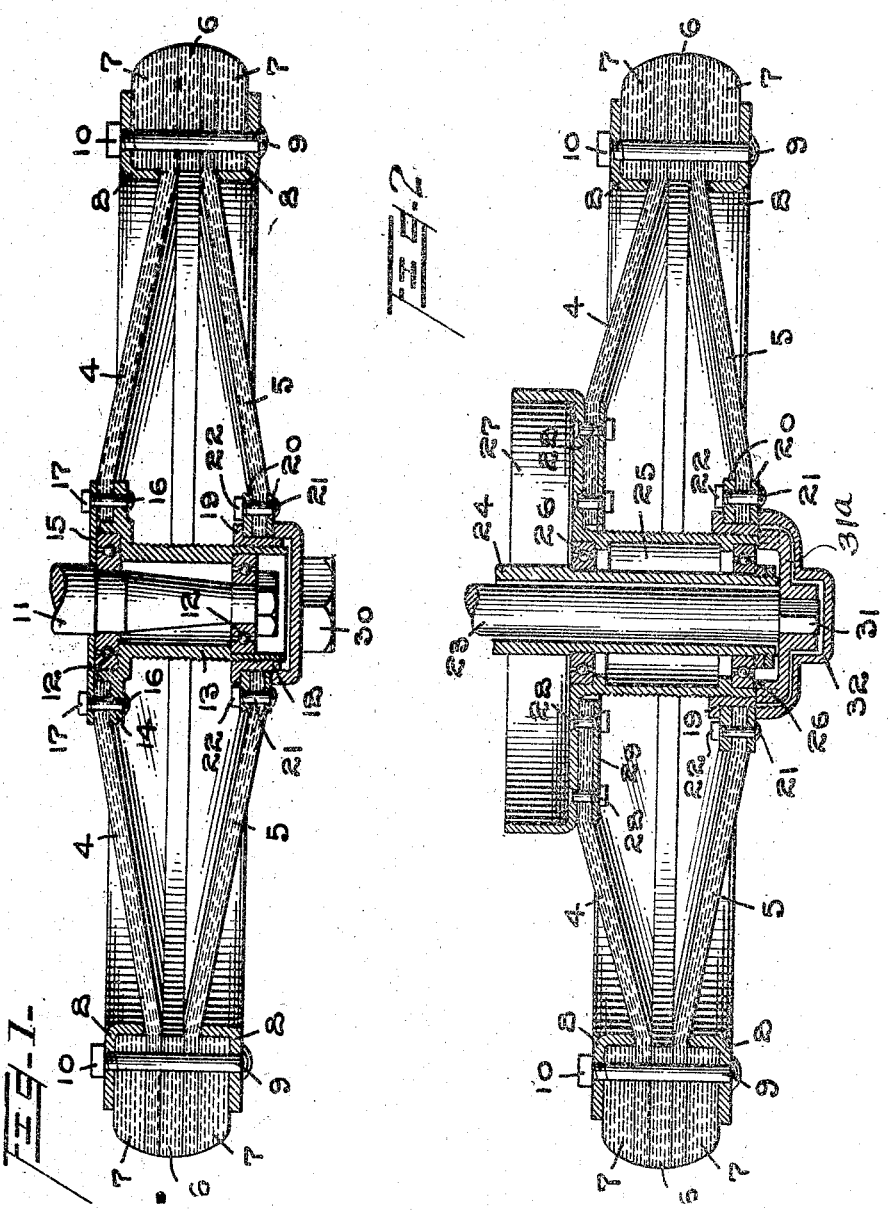

ALLEN E. HALL, OF PHILADELPHIA, PENNSYLVANIA.

WHEEL.

1,186,899.   Specification of Letters Patent.   Patented June 13, 1916.

Application filed April 19, 1915. Serial No. 22,257.

*To all whom it may concern:*

Be it known that I, ALLEN E. HALL, a citizen of the United States, residing at Philadelphia, in the county of Philadelphia and State of Pennsylvania, have invented certain new and useful Improvements in Wheels, of which the following is a specification.

My invention relates to improvements in wheels, the object of the invention being to provide a wheel which will prevent the transmission of shocks and jars to the axle, and hence to the vehicle body, and will result in an easy riding vehicle.

A further object is to provide a wheel having two disks of canvas or similar flexible material connecting the hub and the rim portions, said disks adapted to be separated to draw the material thereof taut, and provide a strong durable cushioning connection between the rim and the hub, absorbing jars and vibrations.

A further object is to provide a wheel of the character stated in which the disks of flexible material extend into and form part of the tread or tire of the wheel, and provide improved means for moving the disks relative to each other to draw the material taut.

With these and other objects in view, the invention consists in certain novel features of construction and combinations and arrangements of parts as will be more fully hereinafter described and pointed out in the claims.

In the accompanying drawings: Figure 1 is a view in section through the front wheel of a vehicle illustrating my improvements, and Fig. 2 is a similar view through the rear wheel of the vehicle.

4 and 5 represent disks which are composed of flexible material such for example as layers of canvas vulcanized or otherwise cemented together. These disks 4 and 5 at their outer edges, are spaced apart by a ring 6, and are provided with rings 7 against their outer faces. These rings 6 and 7, and the outer portions of the disks 4 and 5 constitute the tire or tread portion of the wheel, and are suitably rounded or otherwise shaped as shown. To hold these parts in proper formation, metal rings 8, 8, angular in cross section are positioned at opposite sides of the tire, and are secured by bolts 9 and nuts 10, the bolts passing through registering openings in the rings 8 and in the canvas rings 6 and 7, as well as in the disks 4 and 5. As a matter of fact, the several thicknesses of canvas which I have given reference numerals 6 and 7 are preferably composed of many layers of canvas or other similar material with a rubber or other suitable cement, and all of the parts vulcanized together so that the tire portion constitutes in effect an integral part of the two disks 4 and 5.

The features above described are common to both front and rear wheels, but the connection of the disks at the center or hub of the wheels is somewhat different as will now be described.

11 represents the front axle having ball bearings 12 around the same upon which a cylindrical hub 13 is mounted to turn. The hub 13, at its inner end, is made with an annular flange 14 and a metal ring 15 is located at the inner end of the hub 13. Disk 4 is positioned between the flange 14 and ring 15, and securely clamped between said parts by bolts 16 and nuts 17. The hub 13 is externally screw-threaded and an internally screw-threaded sleeve 18 is adjustable on the hub 13, and this sleeve 18 is provided at its inner end with a flange 19. The outer disk 5, at its center, is formed with an opening to receive the sleeve 18, and is reinforced at opposite sides by rings 20 clamped by bolts 21 and nuts 22. This reinforced opening of the outer disk fits snugly around the sleeve 18, and when the latter is moved toward the outer end of the hub 13, the two disks 4 and 5 will be spread apart at the hub, and hence the material of the disks will be drawn taut.

30 is an ordinary hub nut which is screwed on to the sleeve 18, and serves to clamp the disk 5 between the same and the flange 19 of the sleeve 18, and also exclude dirt and grit from the ball bearings.

The rear axle 23 is mounted in a tube 24, and the hub 25 corresponding to hub 13 turns on ball bearings 26 between the hub 25 and the tube 24. Hub 25 at its inner end is provided with a brake drum 27, and disk 4 is connected to this brake drum by bolts 28 which are projected through a reinforcing ring 29 against the inner face of disk 4. The outer disk 5 is connected to the hub 25 in precisely the same manner as the front wheel, and I have used the same reference numerals to indicate like parts. The end of axle 23 is angular as shown at 31, and a coupling member 31ª inclosed by a covering nut 32, connects the axle with the hub 25 to compel the hub and axle to turn together.

With both forms of wheel, it will be noted that by adjusting the sleeve 18 on the hub 13, the tension of the disks 4 and 5 can be varied, and when the sleeve is moved outwardly as far as possible, the disks will be taut and will not only support great weight, but will act as deadeners to prevent the transmission of shocks and vibrations, and be practically noiseless in operation. Furthermore, it will be noted that with my improved wheel, I do not need any separate tire, although I do not limit myself in this particular, and while I have referred to the material used as canvas, I would have it understood that I do not limit myself to any particular material, but by the term "flexible material" use the term in its broadest sense to cover any material or combinations of material which might be adapted for the purpose.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A wheel comprising a hub, a rim, a pair of disks of non-metallic flexible woven material secured at their outer edges to the rim, and means at the hub separating the disks and holding the same taut, rings between the disks at their outer edges and against the outer faces of the disks cooperating with the edges of the disks to form a tire, substantially as described.

2. A wheel of the character described, comprising two disks of flexible material, the peripheries of said disks constituting portions of the tire of the wheel, and the central portions of said disks connected to the hub of the wheel, substantially as described.

3. A wheel, comprising two disks of non-metallic flexible woven material, a rim to which the outer edges of the disks are secured, a hub, and a sleeve adjustable on the hub, one disk secured to the hub and the other to the sleeve, whereby the movement of the sleeve on the hub draws the disks taut, rings between the disks at their outer edges and against the outer faces of the disks cooperating with the edges of the disks to form a tire, substantially as described.

4. A wheel comprising a hub, a rim, a pair of disks of non-metallic flexible woven material secured at their outer edges to the rim, means at the hub separating the disks and holding the same taut, and a ring located between the disks at their outer edges and secured to both disks cooperating with the latter to form a tire, substantially as described.

5. A wheel, comprising two disks of non-metallic flexible woven material, a rim to which the outer edges of the disks are secured, a hub, and a sleeve adjustable on the hub, one disk secured to the hub and the other to the sleeve, whereby the movement of the sleeve on the hub draws the disks taut, and a ring located between the disks at their outer edges and secured to both disks cooperating with the latter to form a tire, substantially as described.

6. A wheel of the character described, comprising an externally screw-threaded hub, two disks of non-metallic flexible woven material having central openings receiving the hub, one of said disks rigidly secured to the hub, an internally screw-threaded sleeve mounted on the hub, and projecting through the opening in the other of said disks, and devices connecting the outer portions of the disks, substantially as described.

7. A wheel of the character described, comprising an externally screw-threaded hub, two disks of flexible material having central openings receiving the hub, one of said disks rigidly secured to the hub, an internally screw-threaded sleeve mounted on the hub, and projecting through the opening in the other of said disks, reinforcing rings secured to the last-mentioned disk and located around the sleeve, a flange on the inner end of the sleeve engaging one of said last-mentioned rings, and means connecting the outer portions of the disks, substantially as described.

8. A wheel, comprising a hub, and a tire, and flexible disks connecting the hub and the tire and forming a part of the tire, substantially as described.

9. A wheel, comprising a hub, and a tire, flexible disks connecting the hub and the tire and forming a part of the tire, and means for spreading the disks apart at the hub, substantially as described.

In testimony whereof I have signed my name to this specification in the presence of two subscribing witnesses.

ALLEN E. HALL.

Witnesses:
MARIE JACKSON,
CHAS. E. POTTS.